(12) United States Patent
Aldis

(10) Patent No.: US 9,124,424 B2
(45) Date of Patent: Sep. 1, 2015

(54) SYSTEM, APPARATUS AND METHOD FOR LICENSE KEY PERMUTATION

(75) Inventor: David Aldis, Surrey (CA)

(73) Assignee: Arvato Digital Services LLC, New York, NY (US)

( * ) Notice: Subject to any disclaimer, the term of this patent is extended or adjusted under 35 U.S.C. 154(b) by 673 days.

(21) Appl. No.: 12/818,115

(22) Filed: Jun. 17, 2010

(65) Prior Publication Data

US 2010/0322416 A1  Dec. 23, 2010

Related U.S. Application Data

(60) Provisional application No. 61/213,539, filed on Jun. 18, 2009.

(51) Int. Cl.
*H04L 29/06* (2006.01)
*H04L 9/08* (2006.01)

(52) U.S. Cl.
CPC ............. *H04L 9/0894* (2013.01); *H04L 9/0891* (2013.01); *H04L 2209/16* (2013.01); *H04L 2209/603* (2013.01)

(58) Field of Classification Search
CPC ... H04L 9/0894; H04L 9/0891; H04L 9/0869; H04L 2209/16; H04L 2209/603
USPC .......................................................... 380/47
See application file for complete search history.

(56) References Cited

U.S. PATENT DOCUMENTS

| | | | |
|---|---|---|---|
| 6,490,353 B1 * | 12/2002 | Tan .................................. | 380/37 |
| 7,203,958 B2 * | 4/2007 | Tanaka et al. ................... | 726/19 |
| 2002/0152400 A1 * | 10/2002 | Zhang et al. ................... | 713/201 |
| 2009/0279692 A1 * | 11/2009 | Perlman .......................... | 380/28 |

* cited by examiner

*Primary Examiner* — Jeffrey D Popham
(74) *Attorney, Agent, or Firm* — Roylance, Abrams, Berdo & Goodman, LLP

(57) ABSTRACT

A system and method of dynamically altering the encoding, structure or other attribute of a cryptographic key, typically a license activation key, to render useless keys that have been created by illegal key generation "cracks". An encoding/decoding engine provides a plurality of key obfuscation algorithms that may alter the structure, encoding or any other attribute of a given key. A changeable combination code is supplied to the encoding/decoding engine that specifies a subset of the algorithms to apply during the encoding or decoding phase. The encoding engine is used during key generation and the decoding engine used during key usage. The same combination code must be used during decoding as was used during encoding to recover the original key or a valid key will not be recovered. Thus, a system can be rapidly re-keyed by selecting a new combination of encoding/decoding algorithms. The selection of algorithms comprises a combination code. The new combination code will result in keys that are incompatible with any existing illegal key generators.

27 Claims, 7 Drawing Sheets

SYSTEM, APPARATUS AND METHOD FOR LICENSE KEY PERMUTATION

CROSS-REFERENCE TO RELATED PATENT APPLICATION

This application claims the benefit under 35 U.S.C. §119 (e) of U.S. Provisional Patent Application. No. 61/213,539, filed on Jun. 18, 2009 in the U.S. Patent and Trademark Office, the entire disclosure of which is hereby incorporated by reference.

FIELD OF THE INVENTION

The present application relates to the areas of software encryption, licensing and security. Particularly, the present invention provides a system, apparatus and method for altering the generation and validation of cryptographic and/or license verification keys using a configurable combination code.

BACKGROUND OF THE INVENTION

Traditionally, application software use license verification systems for controlling use of application software and other protected content employing a key or key-pair that is generated and, at some point, used in protocols whose purpose is typically, but not exclusively, to verify ownership of a software or content license.

These key-based systems are frequently compromised by illegal key generator software applications produced by software crackers. Frequently referred to as "key-gens," these programs are capable of mimicking the methods used to create license keys. These illegal keys can then be supplied to the application during product activation resulting in theft of the software license.

Traditionally, illegal "key-gen" applications typically rely on analyzing an installation key (i.e. product key) that is either entered manually or scraped from the system. The installation key is analyzed and a correctly paired activation key is generated. These applications are dependent on reproducing the methods that a legitimate system uses to produce these key pairs.

A fundamental technological issue when combating these key-gens is that the underlying primary verification methods and protocols are embedded within application source code. Modifying application logic to thwart illegal key-gens (that is, in order to generate new valid key pairs) can take months or potentially years on larger applications.

Because the effort to design and develop new key generation and license verification protocols is greater than the effort and time to reverse engineer them, the hacker community is capable of rapidly compromising these methods and systems, typically within weeks of a new release of software.

Traditional systems are rigid, difficult and time consuming to change. Like an old iron lock that must be re-forged to change the key, once the method to generate the key has been discovered, it takes far too long to address the problem of re-securing the system.

What is needed is a system that can rapidly alter the structure and methods used to generate the keys and re-secure the system at a rate that is equivalent to or better than the rate at which illegal key generators can compromise those structures and methods.

Illustrative embodiments of the present invention address at least the drawbacks associated with conventional system and provide many advantages.

SUMMARY OF THE INVENTION

As noted above, exemplary embodiments of the present invention address at least the above problems and/or disadvantages, and provide at least the advantages described below.

Exemplary embodiments of the present invention provide a system, method and apparatus that can rapidly alter the structure and methods used to generate the keys and re-secure the system at rate that is equivalent to or better than the rate at which illegal key generators can compromise the keys.

Exemplary embodiments of the present invention provide for a method, system and apparatus for generating and/or utilizing a mangled license key for invalidating an illegally produced key in a computer license validation system by generating a combination key that utilizes a subset of key obfuscation algorithms of a master set or collection of algorithms to encode an installation key, encrypting the installation key using the combination key, thereby producing a mangled license key, and decoding the mangled license key to produce the installation key.

Exemplary embodiments of the present invention provide a system, method and apparatus for invalidating the illegal keys produced illegally by illegal key generator software application programs by altering both the structure of the keys and the methods used to generate the keys. A changeable combination code is used to select a subset of key obfuscation algorithms from a larger master-set. The original key is then processed by this subset of algorithms producing a key that is incompatible with the illegal key generator.

Exemplary embodiments of the present invention provide a system, method and apparatus for altering a license key system to invalidate a compromised key without changing the fundamental construction of the license key system.

Exemplary embodiments of the present invention provide additional benefits relating to systems that use cryptographic data other than activation/installation key pairs.

Further, exemplary embodiments of the present invention provide for a system, method and apparatus for license key permutation in the context of using installation/activation key pairs.

BRIEF DESCRIPTION OF THE DRAWINGS

The above and other exemplary features, aspects and advantages of the present invention will become more apparent from the following detailed description of certain exemplary embodiments thereof when taken in conjunction with the accompanying drawings in which.

Throughout the drawings, like reference numerals will be understood to refer to like elements, features and structures.

DETAILED DESCRIPTION OF EXEMPLARY EMBODIMENTS

The matters exemplified in this description are provided to assist with a comprehensive understanding of exemplary embodiments of the present invention described with reference to the accompanying drawing figures. Accordingly, those of ordinary skill in the art will recognize that various changes and modifications of the exemplary embodiments described herein can be made without departing from the scope and spirit of the present invention. Also, descriptions of well-known functions and constructions are omitted for clarity and conciseness. Likewise, certain naming conventions, labels and terms as used in the context of the present disclosure are, as would be understood by skilled artisans, non-limiting and provided only for illustrative purposes to facilitate understanding of certain exemplary implementations of the embodiments of the present invention.

FIGS. 1-8 illustrate exemplary embodiments of the present invention that provide for a method, system and apparatus for generating and/or utilizing a mangled installation key for invalidating an illegally produced installation key in a computer license validation system by generating a combination key to utilize a subset of key obfuscation algorithms to encode an installation key, encrypting the installation key in accordance with the combination key, thereby producing a mangled installation key, and then decoding the mangled installation key to produce the installation key.

Figure 1:
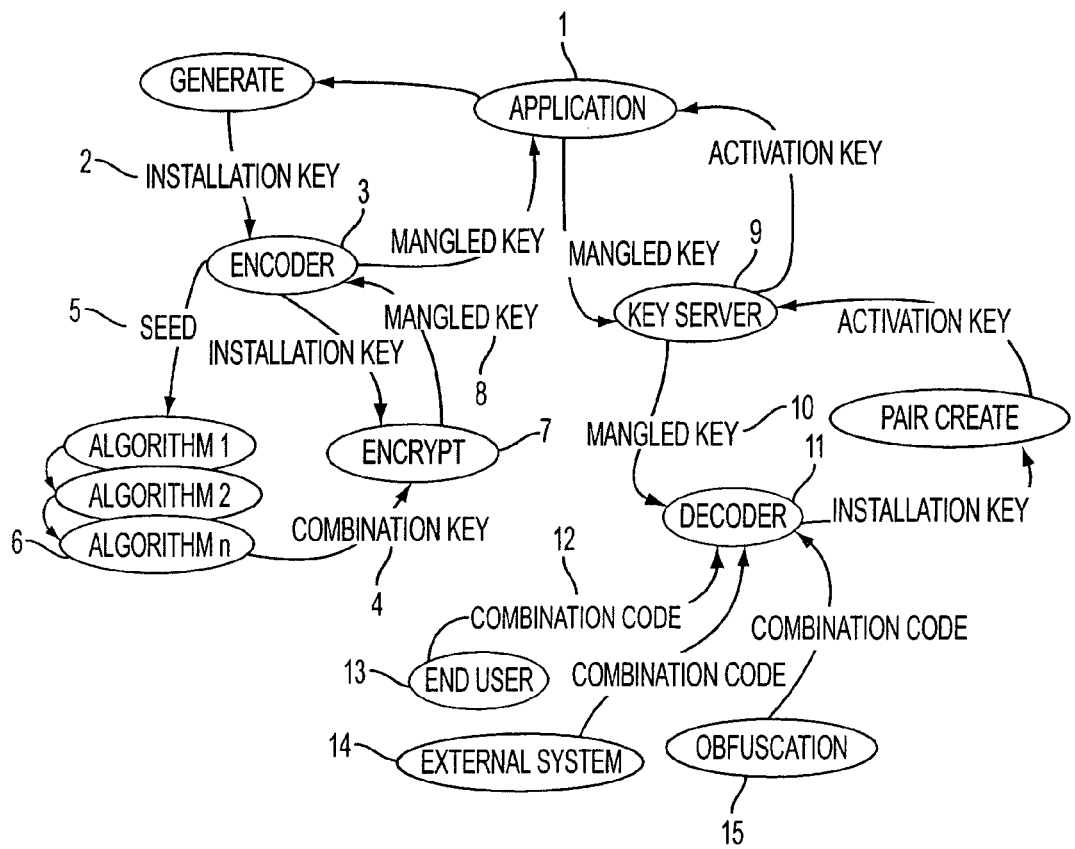
FIG. 1 is a schematic block diagram that illustrates an overview of the entire key permutation process within the context of product license activation method, system and apparatus of the present invention, according to an exemplary embodiment.

FIG. 1 is a schematic block diagram that illustrates an overview of the key permutation process within the context of product license activation method, system and apparatus of the present invention, according to an exemplary embodiment. For example, when an application 1 generates an installation key 2, it passes it to the encoder 3 for processing. A "combination key" 4 is generated by passing seed data 5 (for example, seed data can be any data that is known, generated or stored by the application, such as a hardware identifier, the original activation key or installation key) through a series of obfuscation algorithms (1 ... n). The output of each algorithm is chained to the input of the next creating a complex code path 6. An algorithm can be any algorithm such as a hashing algorithm, mathematical algorithm or any other algorithm, provided that the algorithm produces consistent results. Some exemplary obfuscation algorithms are:

Hashing the input using an array of bytes;
Using XOR with each byte of the input or an external buffer;
Reverse or jumble the bits in the key using a known pattern;
Run the input through an encryption algorithm;
Hashing the input using any algorithm (i.e. MD5, SHA1, etc), among other obfuscation algorithms.

Once generated, the combination key is used to encrypt 7 the original installation key and produce a new permutation of the key which can be referred to as a mangled key or mangled installation key 8.

According to exemplary implementations of the present invention, the obfuscation algorithms used during the combination key generation phase are a sub-set of a larger collection of algorithms, all of which are known to the decoder (e.g., decoder 11 in FIG. 1) and are all stored at a server (e.g. key server 9 in FIG. 1) to allow it to generate an activation code corresponding to the installation code when license verification is desired. This allows the selection of a sub-set of the algorithms during the key obfuscation phase using a combination code which specifies the obfuscation algorithms to employ. Alternatively, the sub-set of algorithms can be selected and then the combination code generated based on those selected algorithms. Changing the combination code changes the selection of algorithms used to create the mangled installation key resulting in an output unique to the given combination code.

Figure 2:
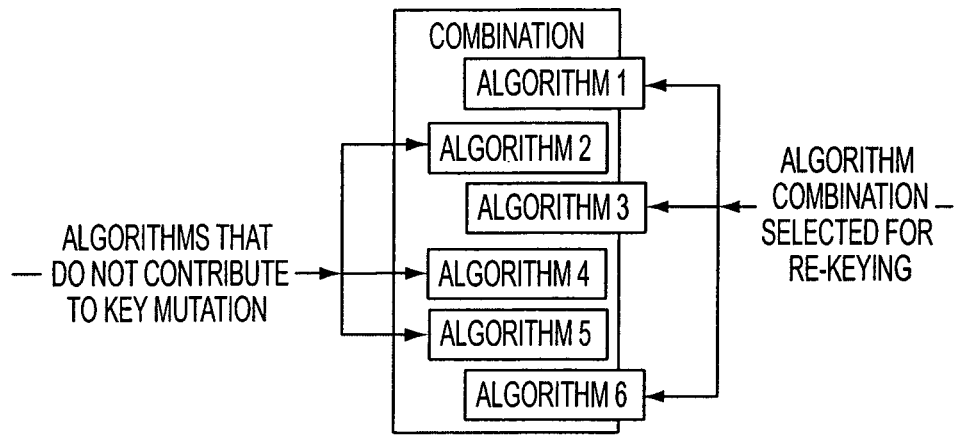
FIG. 2 is a schematic block diagram that illustrates how selection of a combination code relates to (for example, influences) the algorithms selected for employment during encoding and decoding within the context of product license activation method, system and apparatus of the present invention, according to an exemplary embodiment.

FIG. 2 is a schematic block diagram that illustrates a combination selection according to an exemplary implementation of the present invention, where any number or combination of algorithms may be used, order is not important, and each algorithm may preferably only be used once within a combination, so the formula to calculate the number of possible key combinations is:

$$\sum_{r=1}^{n} \frac{n!}{r!(n-r)!}$$

where n is the number of algorithms and r is the number selected. With modest obfuscation algorithms such as 16 algorithms, 65535 unique combinations are possible. Because the combination key is generated dynamically, it is not possible to use static analysis to determine how the installation key was encrypted (e.g., mangled) to thwart hackers from illegally obtaining and using the installation key. Furthermore, because the combination code is actually specifying the algorithms to employ, it forces the process of key generation through a path of execution unique to the given code. This, in turn, means that for any new combination, a software cracker would be forced to do an active re-analysis of the key generation process in order to produce an illegal key-gen for that code. This makes it difficult for the cracker to reverse engineer but easy for a legitimate system because all that is required is a change to the combination code.

With continued reference to FIG. 1, when a key-server 9 needs to generate a key pair, it passes the mangled key 10 to the decoder 11 along with the combination code 12. The decoder parses the combination code 12 to determine which algorithms were used to generate the combination key. The combination code may be supplied through various sources such as via an end user 13, an external system 14 or by obfuscation 15 (for example, embedded in the application code), or passing it with the mangled key. The combination code is then used to decrypt and recover the original installation key. The key-server 9 then uses the usual method to create a correctly paired product activation key.

According to exemplary embodiments of the present invention, the key encoder may work in a static, dynamic or hybrid implementation employing both static and dynamic encoding.

According to an exemplary embodiment of the present invention, in a static implementation, the encoder is compiled using a hard coded sub-set of algorithms. The combination code in this case could be a static value well-known by the decoder. This has the advantage that there is no need to transmit the combination code and only a sub-set of the algorithms need to be exposed on a target system, making it impossible to perform any local analysis on the entire set of the collection of algorithms used by the server 9.

Figure 3:
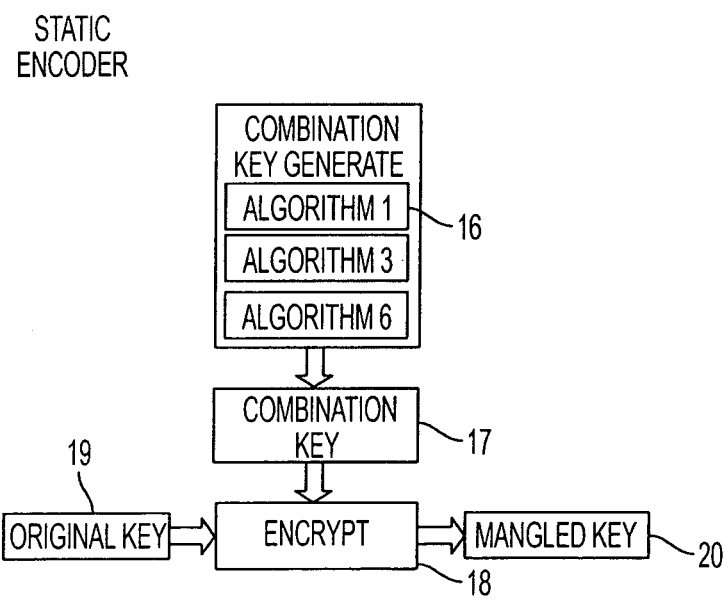
FIG. 3 is a schematic block diagram that illustrates interaction in a system using a static set of algorithms used to generate a mangled key within the context of product license activation method, system and apparatus of the present invention, according to an exemplary embodiment.

FIG. 3 is a schematic block diagram that illustrates a static encoder which comprises a fixed set of obfuscation algorithms 16 (e.g., a subset of the collection of algorithms used by the server 9) that are hard-coded and compiled into the application code, according to an exemplary embodiment of the present invention. These algorithms generate the combination key 17 that is used to encrypt 18 the original key 19 producing a mangled key 20. The decoder 11 must be supplied a combination code that matches the hard-coded algorithms employed in the static encoder. If an illegal key-gen program is discovered, a new version of the static encoder must be released that implements a different combination of all or some of the subset of hard-coded obfuscation algorithms 16 compiled into the application code.

According to an exemplary embodiment of the present invention, in a dynamic implementation, the encoder can implement preferably the entire set of the collection of obfuscation algorithms used by the server 9. These algorithms are selected dynamically based on a given combination code. This method has the advantage that new combinations can be created without a software release (e.g., the combination can be communicated a different way to the decoder than compiled, for example, in the application code) but at the cost of exposing more of the system for analysis by a hostile party.

Figure 4:
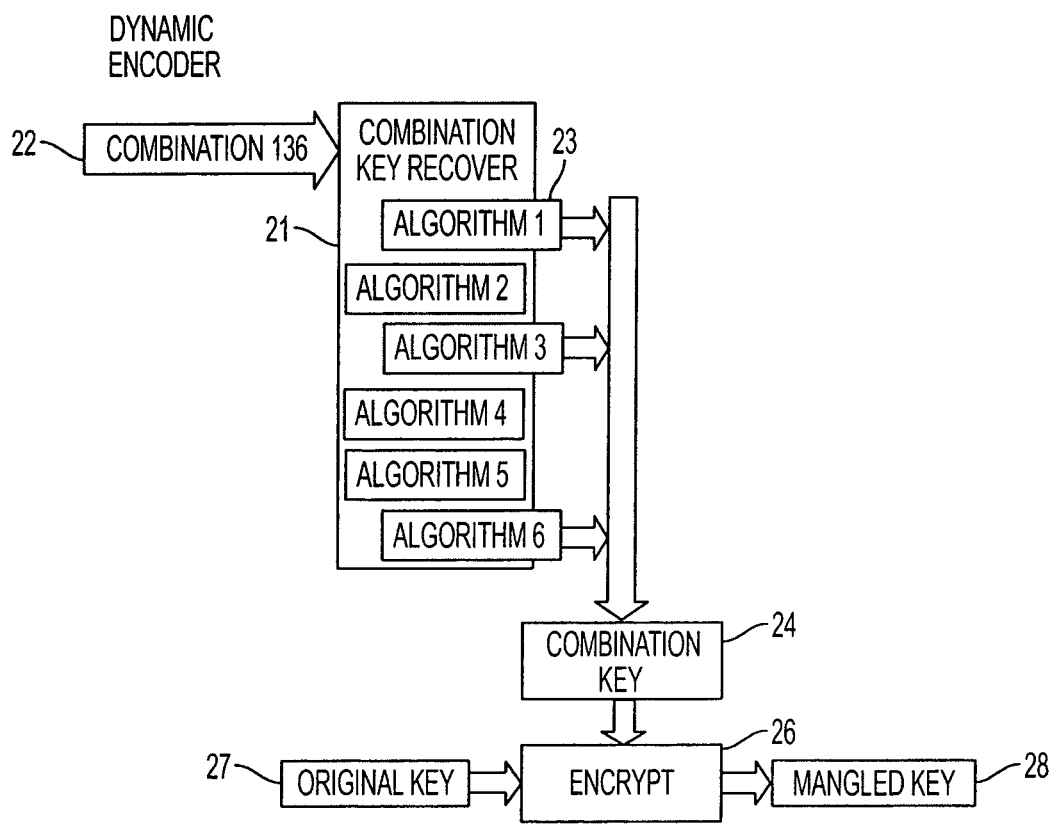
FIG. 4 is a schematic block diagram that illustrates how selection of a combination code relates to (for example, influences) the algorithms selected for employment during encoding and decoding within the context of product license activation method, system and apparatus of the present invention, according to an exemplary embodiment.

FIG. 4 is a schematic block diagram that illustrates a dynamic encoder implementing a richer set of obfuscation algorithms 21 than a static encoder (e.g., in FIG. 3), according to an exemplary embodiment of the present invention. During the encoding phase, a combination code 22 is supplied that specifies the algorithms to employ (23) when generating the combination key (24). The combination key (24) is used to encrypt (26) the given original key (27) producing a mangled key (28) that is unique to the given combination code (22).

According to an exemplary embodiment of the present invention, a hybrid implementation can use a combination of hard-coded algorithms and a dynamically selected set. This may provide the best balance between security and flexibility.

According to an exemplary embodiment of the present invention, if an illegal key-gen program is discovered, a different combination code is supplied to force the creation of an incompatible mangled key (28).

Figure 5:
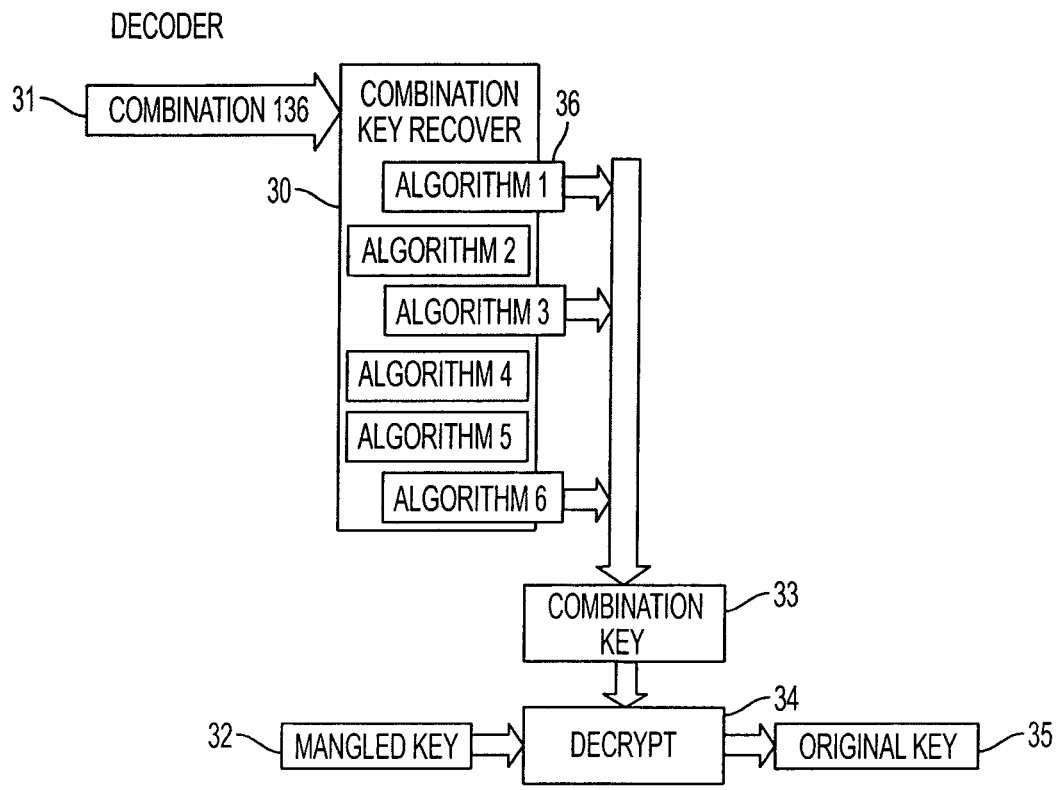
FIG. 5 is a schematic block diagram that illustrates how selection of a combination code relates to (for example, influences) the algorithms selected for employment during encoding and decoding within the context of product license activation method, system and apparatus of the present invention, according to an exemplary embodiment of the present invention.

According to an exemplary embodiment of the present invention, FIG. 5 illustrates that, at some point, the original key is recovered so it can be used during a normal process of key-pair generation, encryption, verification or other key use typical of a cryptographic or secure system. There may be multiple versions of static and dynamic encoders that have been built for different usage scenarios or to combat illegal key-gens. The decoder includes every obfuscation algorithm (30) that is employed in these encoders.

Every algorithm in use has a unique identifier that is encoded in the combination code (31). This allows the decoder to determine which specific set of obfuscation algorithms (30) were employed in the generation of the mangled key (32). The correct set of algorithms is selected based on information from the combination code (31) and a combination key (33) is generated. The combination key (33) is used to decrypt (34) the mangled key (32) and recover the original key (35). Once the original key has been recovered, the system may use it normally in any cryptographic or other secure process.

Figure 6:
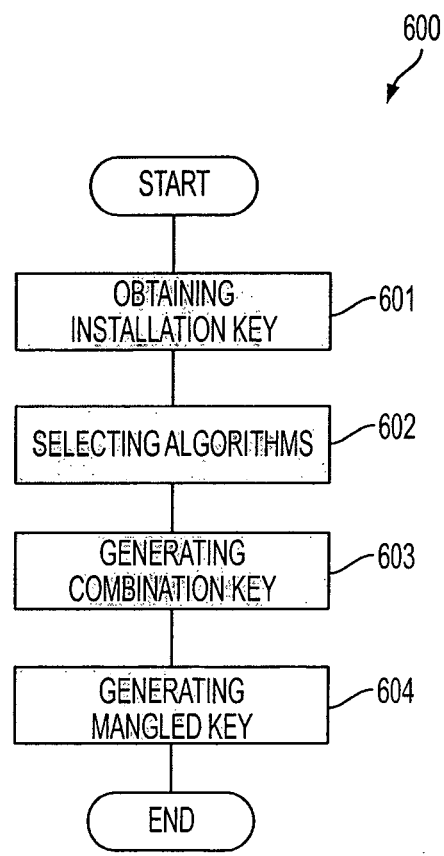
FIG. 6 is a flow diagram that illustrates an overview of the method for utilizing a mangled installation key for invalidating an illegally produced installation key in a computer license validation system, according to an exemplary implementation of the present invention.

FIG. 6 illustrates an exemplary embodiment of the present invention providing a method 600 for utilizing a mangled installation key for invalidating an illegally produced key in a computer license validation system, the method comprising the steps of obtaining an installation key 601, selecting a subset of key obfuscation algorithms from a master set of key obfuscation algorithms based on a combination code 602, generating a combination key by processing seed data with the subset of key obfuscation algorithms 603, and generating the mangled installation key by processing the installation key with the combination key 604, wherein the mangled installation key is different than the illegally produced key, and wherein the method is computer-implemented.

Figure 7:
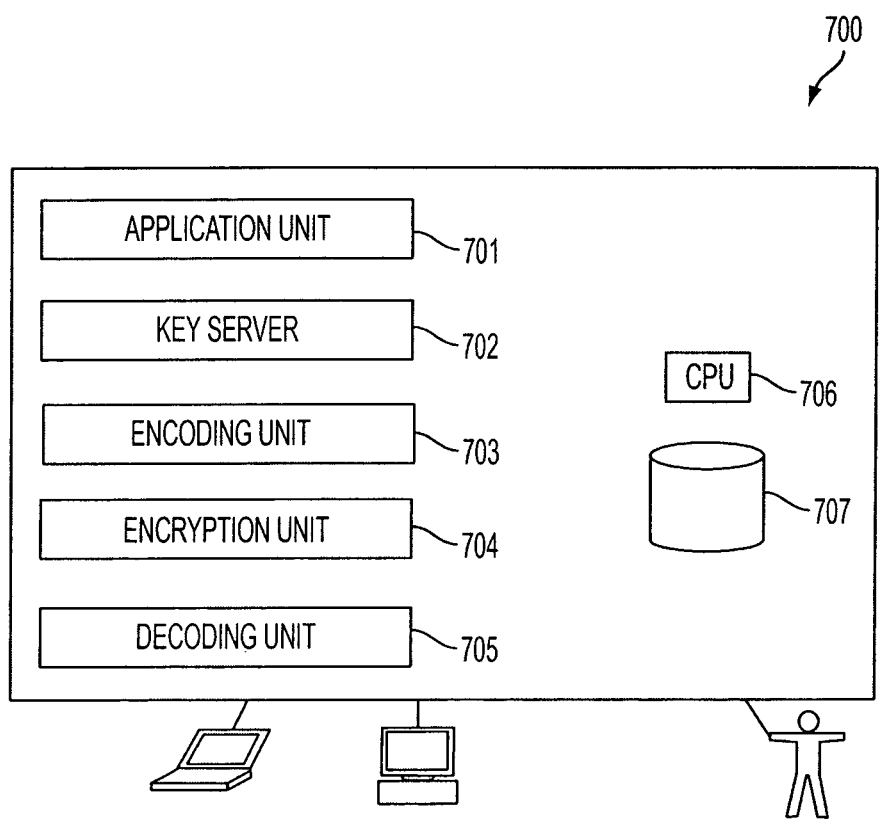
FIG. 7 is a schematic block diagram that illustrates an apparatus for generating a mangled license installation key for invalidating an illegally produced key, according to an exemplary embodiment of the present invention.

FIG. 7 illustrates an exemplary embodiment of the present invention providing a computer 706, 707 implemented apparatus 700 generating a mangled installation key for invalidating an illegally produced key, the apparatus comprising an application unit for generating or obtaining an installation key 701, a key server for generating a product activation key and installation key pair 702, an encoding unit for generating a combination key by selecting a subset of key obfuscation algorithms from a master set of key obfuscation algorithms based on a combination code 703, an encryption unit for encrypting the installation key using the combination key and thereby, producing a mangled installation key 704, and a decoding unit for decoding the mangled installation key, thereby producing a result installation key, and further comprising selecting the subset of key obfuscation algorithms from the master set of key obfuscation algorithms provided at the decoding unit, based on the combination code 705, wherein the mangled installation key is a varied permutation of the installation key.

Figure 8:
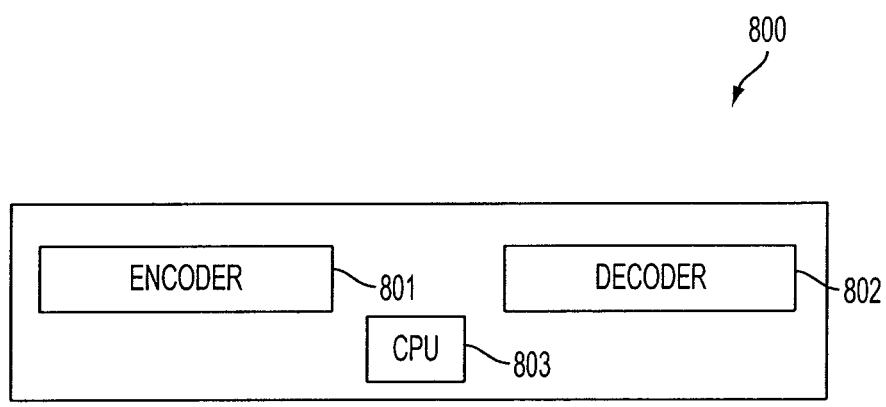
FIG. 8 is a schematic block diagram that illustrates a computer license validation system for generating a mangled license installation key for invalidating an illegally produced key, according to an exemplary embodiment of the present invention.

FIG. 8 illustrates an exemplary embodiment of the present invention providing a computer license validation system 800 for generating a mangled installation key for invalidating an illegally produced key, the system comprising an encoder for encoding and producing the mangled installation key by processing an installation key with a subset of key obfuscation algorithms selected from a master set of key obfuscation algorithms based on a combination code 801, and a decoder for decoding the mangled installation key by processing the mangled installation key with a subset of key obfuscation algorithms selected from a master set of key obfuscation algorithms provided at the decoder based on a combination code, thereby producing a result installation key 802.

Further, FIG. 8 illustrates an exemplary embodiment of the present invention providing a system 800 comprising a computer processor 803 for executing a computer program embodied on a computer readable storage medium, the computer program executing instructions for generating a mangled installation key for invalidating an illegally produced key.

The above-described exemplary embodiments of an apparatus, system and method in computer-readable media include program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and so on, including a carrier wave transmitting signals specifying the program instructions, data structures, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for utilizing a mangled installation key for invalidating an illegally produced key in a computer license validation system having an encoder and decoder, the method comprising the steps of:
   storing a master set comprising a plurality of predetermined key obfuscation algorithms on the computer license validation system;
   designating a combination code that specifies selected ones of the predetermined key obfuscation algorithms stored in the master set to be included in a subset and providing the combination code to the encoder and the decoder before any installation key is obtained, the key obfuscation algorithms in the subset being selected from among the predetermined key obfuscation algorithms in the stored master set and not including all of the predetermined key obfuscation algorithms of the master set;
   obtaining, by a microprocessor, an installation key;
   generating, by the encoder, a combination key by processing seed data with the subset of key obfuscation algorithms specified by the combination code, wherein an output of each of the subset of obfuscation algorithms is chained to an input of a subsequent obfuscation algorithm in the subset; and
   generating the mangled installation key by processing the installation key with the combination key, and
   decoding, by the decoder, the mangled installation key by processing the mangled installation key with the algorithms specified by the combination code.

2. The method of claim 1, wherein the installation key is entered by a user or obtained by the system.

3. The method of claim 1, wherein the combination code is changed to specify a different subset of key obfuscation algorithms selected from the master set, the different subset having at least one key obfuscation algorithm not in common with the key obfuscation algorithms specified by the previous combination code.

4. The method of claim 1, wherein the seed data comprises data that is retained, stored or generated by the system.

5. The method of claim 1, wherein the result installation key is equivalent to the installation key.

6. The method of claim 1, wherein the decoding further comprises accessing a subset of key obfuscation algorithms from a copy of the master set of key obfuscation algorithms provided at the decoder based on the combination code to process the mangled installation key with the subset of key obfuscation algorithms used to produce the result installation key.

7. The method of claim 1, wherein an activation key is paired with the installation key, and further comprises analyzing the result installation key and generating another activation key that is compatible with the installation key paired with the activation key.

8. The method of claim 1, wherein each algorithm in the subset is used a single time.

9. A computer implemented apparatus having a non-transitory computer readable medium for generating a mangled installation key for invalidating an illegally produced key, the apparatus comprising:
   a microprocessor executing the following units;
   an application unit for generating or obtaining an installation key;
   a key server for generating a product activation key and installation key pair;
   an encoding unit for storing a master set comprising a plurality of predetermined key obfuscation algorithms,
   the encoding unit designating a combination code that specifies selected ones of the predetermined key obfuscation algorithms stored in the master set to be included in a subset and providing the combination code to the encoder and the decoder before any installation key is obtained, the key obfuscation algorithms in the subset being selected from among the predetermined key obfuscation algorithms in the stored master set and not including all of the predetermined key obfuscation algorithms of the master set;
   the encoding unit generating a combination key by processing seed data with the subset of key obfuscation algorithms specified by the combination code, wherein an output of each of the subset of key obfuscation algorithms is chained to an input of a subsequent obfuscation algorithm in the subset;
   an encryption unit for encrypting the installation key using the combination key and thereby, producing a mangled installation key; and
   a decoding unit for decoding the mangled installation key by processing the mangled installation key with the algorithms specified by the combination code.

10. The apparatus of claim 9, wherein the key obfuscation algorithms alter the structure or any other attribute of a given key.

11. The apparatus of claim 9, wherein the combination code is generated by at least one or more of an external system or apparatus, the application unit or the key server, an obfuscation algorithm or a user.

12. The apparatus of claim 9, wherein the encoding unit implements static encoding, dynamic encoding or hybrid encoding, wherein the hybrid encoding employs a combination of static and dynamic encoding.

13. The apparatus of claim 12, wherein the static encoding comprises the encoding unit utilizing a hard-coded sub-set of algorithms, wherein the combination code is a static value known by the decoder.

14. The apparatus of claim 13, wherein the hard-coded sub-set of algorithms generate a combination key for encrypting the installation key to produce the mangled installation key, and the decoding unit receives the combination code that matches the hard-coded sub-set of algorithms utilized by the encoding unit for static encoding.

15. The apparatus of claim 12, wherein said dynamic encoding includes selecting a sub-set of key obfuscation algorithms from a master set of algorithms based on the combination code.

16. The apparatus of claim 15, wherein the mangled installation key is unique to the combination code.

17. The apparatus of claim 12, wherein the hybrid encoding uses a combination of hard coded algorithms and a dynamically selected sub-set of key obfuscation algorithms based on the combination code.

18. The apparatus of claim 9, wherein the key server receives the mangled installation key and passes the mangled key to the decoding unit along with the combination code.

19. The apparatus of claim 9, wherein the decoding unit accesses the subset of key obfuscation algorithms from a copy of the master set of key obfuscation algorithms provided at a decoding unit based on the combination code to process the mangled installation key with the subset of key obfuscation algorithms to produce the result installation key.

20. The apparatus of claim 9, wherein said decoding unit includes a set of algorithms identical to a set of algorithms included with said encoding unit.

21. The apparatus of claim 9, wherein the subset of key obfuscation algorithms selected by the decoding unit are employed to generate the combination key for the mangled key, and the decoding unit utilizes the combination key to recover the installation key.

22. The apparatus of claim 9, wherein the algorithms are each associated with a unique identifier that is utilized by the combination code to identify each of the algorithms.

23. The apparatus of claim 9, wherein the installation key is received from a user, received from an application and/or determined by the license validation system.

24. The apparatus of claim 9, wherein the each algorithm provides consistent results.

25. A computer license validation system having a non-transitory computer readable medium for generating a mangled installation key for invalidating an illegally produced key, the system comprising:
a microprocessor functionally executing an encoder and a decoder;
the encoder stores a master set comprising a plurality of predetermined key obfuscation algorithms;
the encoder designates a combination code that specifies selected ones of the predetermined key obfuscation algorithms stored in the master set to be included in a subset and providing the combination code to the encoder and the decoder before any installation key is obtained, the key obfuscation algorithms in the subset being selected from among the predetermined key obfuscation algorithms in the stored master set and not including all of the predetermined key obfuscation algorithms of the master set;
the microprocessor obtains an installation key;
the encoder generates a combination key by processing seed data with the subset of key obfuscation algorithms specified by the combination code, wherein an output of each of the subset of key obfuscation algorithms is chained to an input of a subsequent obfuscation algorithm in the subset;
the encoder generates the mangled installation key by processing the installation key with the combination key; and
the decoder decodes the mangled installation key by processing the mangled installation key with the algorithms specified by the combination code.

26. A non-transitory computer-readable medium having embodied thereon programmed code for executing a method of utilizing a mangled installation key for invalidating an illegally produced key in a computer license validation system having an encoder and decoder, the method comprising the steps of:
obtaining, by a microprocessor, an installation key;
storing a master set comprising a plurality of predetermined key obfuscation algorithms on the computer license validation system;
designating a combination code that specifies selected ones of the predetermined key obfuscation algorithms stored in the master set to be included in a subset and providing the combination code to the encoder and the decoder before any installation key is obtained, the key obfuscation algorithms in the subset being selected from among the predetermined key obfuscation algorithms in the stored master set and not including all of the predetermined key obfuscation algorithms of the master set;
generating, by the encoder, a combination key by processing seed data through the subset of key obfuscation algorithms specified by the combination code, wherein an output of each of the subset of obfuscation algorithms is chained to an input of a subsequent obfuscation algorithm in the subset; and
generating the mangled installation key by processing the installation key with the combination key, and
decoding, by the decoder, the mangled installation key by processing the mangled installation key with the algorithms specified by the combination code.

27. A non-transitory computer-readable medium having embodied thereon programmed code for executing a method of utilizing a mangled installation key for invalidating an illegally produced key in a computer license validation system, said programmed code comprising:
a code segment for obtaining an installation key;
a code segment for storing a master set comprising a plurality of predetermined key obfuscation algorithms on the computer license validation system;
a code segment for designating a combination code that specifies selected ones of the predetermined key obfuscation algorithms stored in the master set to be included in a subset and providing the combination code to the encoder and the decoder before any installation key is obtained, the key obfuscation algorithms in the subset being selected from among the predetermined key obfuscation algorithms in the stored master set and not including all of the predetermined key obfuscation algorithms of the master set;
a code segment for generating a combination key by processing seed data with the subset of key obfuscation algorithms specified by the combination code, wherein an output of each of the subset of obfuscation algorithms is chained to an input of a subsequent obfuscation algorithm in the subset;
a code segment for generating a mangled installation key by processing the installation key with the combination key; and a code segment for decoding the mangled installation key by the decoder by processing the mangled installation key with the algorithms specified by the combination code.

* * * * *